United States Patent [19]

Schumm

[11] Patent Number: 4,758,832

[45] Date of Patent: Jul. 19, 1988

[54] METHOD AND APPARATUS FOR SIMULTANEOUSLY TRANSMITTING PLURAL INDEPENDENT COMMANDS

[75] Inventor: Erwin Schumm, Neuried, Fed. Rep. of Germany

[73] Assignee: Siemens Aktiengesellschaft, Berlin and Munich, Fed. Rep. of Germany

[21] Appl. No.: 894,817

[22] Filed: Aug. 8, 1986

[30] Foreign Application Priority Data

Aug. 23, 1985 [DE] Fed. Rep. of Germany ....... 3530219

[51] Int. Cl.[4] ............ H04Q 9/00

[52] U.S. Cl. ............ 340/825.620; 340/825.510

[58] Field of Search ........... 340/825.5, 825.51, 825.62, 340/825.73

[56] References Cited

U.S. PATENT DOCUMENTS

| | | | |
|---|---|---|---|
| 3,701,109 | 10/1972 | Peters | 340/825.51 |
| 4,016,539 | 4/1977 | Nanya | 340/825.5 |
| 4,074,233 | 2/1978 | Swain | 340/825.51 |
| 4,189,766 | 2/1980 | Horiguchi et al. | 340/825.5 |
| 4,562,427 | 12/1985 | Ecton | 340/825.5 |
| 4,571,586 | 2/1986 | Right | 340/825.51 |
| 4,630,041 | 12/1986 | Casamatta et al. | 340/825.5 |

FOREIGN PATENT DOCUMENTS

| | | |
|---|---|---|
| 1487826 | 12/1974 | Fed. Rep. of Germany . |
| 2139288 | 1/1973 | France . |
| 1377557 | 10/1969 | United Kingdom . |

*Primary Examiner*—Donald J. Yusko
*Attorney, Agent, or Firm*—Hill, Van Santen, Steadman & Simpson

[57] ABSTRACT

In a command transmission system, a maximum of n independent commands are supplied to a transmitter and are converted into different signals which are transmitted in series over a transmission line. When no command is present, a no-command signal is formed for transmission over the transmission line. When simultaneous commands are present, only command-associated signals are transmitted, cyclically and sequentially, over the transmission line, as long input commands are pending. At the receiving end of the transmission line, the signals are decoded and converted into signals which are manifested simultaneously on a plurality of output terminals.

8 Claims, 3 Drawing Sheets

METHOD AND APPARATUS FOR SIMULTANEOUSLY TRANSMITTING PLURAL INDEPENDENT COMMANDS

BACKGROUND

The present invention relates to a method for simultaneously transmitting a plurality of independent commands over a transmission line. The commands are supplied to a coding facility at the sending end of the transmission line, and are there converted into transmittable code signals. At the receiving end of the transmission line, the transmitted signals are decoded and converted back into command signals which are supplied in parallel to a plurality of output terminals.

In the traditional systems, simultaneously occuring commands have been transmitted over a plurality of lines, allocated one line per command. At times during which no commands occur, the lines are not loaded or are only partially loaded.

It is also been possible to transmit simultaneously occuring commands with frequency-multiplex technology, using a broad frequency band which is divided into narrow sub-bands, with commands being allocated individually to the sub-bands. Frequency-division multiplex technology, however, requires modulation with different carrier frequencies and also requires transmission lines with sufficiently broad band characteristics to handle all of the sub-bands.

Simultaneously occuring commands can also be transmitted using time-division multiplex technology. In this technology, pulse frames of a constant length are formed and divided into successive time slots for each channel. When a great number of commands is expected, a correspondingly great number of channel slots must be provided so that the average delay time greatly increases, meaning the time between the appearance of a command at the sending station and the reception thereof at the receiving end of the transmission line.

BRIEF DESCRIPTION OF THE INVENTION

It is a principal object of the present invention to provide a method for simultaneous transmission of independent commands which avoids the foregoing disadvantages. In addition, it is an object to provide a method for transmitting such commands as free as possible of distortion, with great reliability, over a single channel system, normally capable of transmitting only a single command at a time.

The present invention realizes the advantages of greater transmission efficiency, and inexpensive construction.

In one embodiment of the present invention, a command is recognized and leads to the formation of a command-associated signal, and when to or more commands simultaneously appear, command-associated signals are cyclically formed in a prescribed sequence as long as the commands persist.

In a further development of the present invention, the non-appearance of commands leads to a no-command signal transmitted over the transmission line.

BRIEF DESCRIPTION OF THE DRAWINGS

Reference will now be made to the accompanying drawings in which.

DESCRIPTION OF THE PREFERRED EMBODIMENTS

Figure 1:
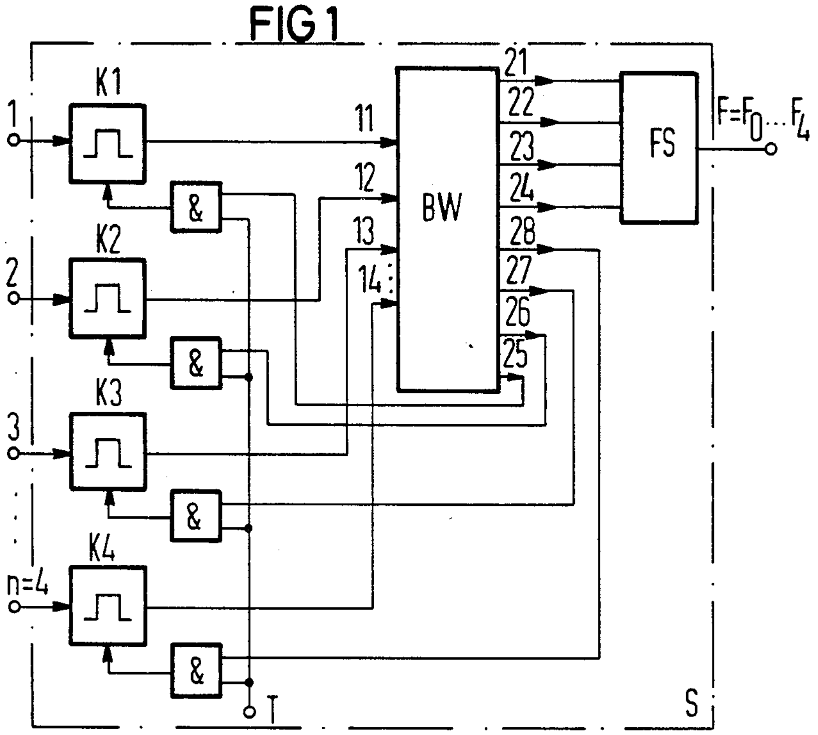
FIG. 1 is a schematic diagram of sending apparatus incorporating an illustrative embodiment of the present invention.

FIG. 1 illustrates a sending facility S, located at the sending end of a transmission line and having a plurality, for example 4, trigger circuits comprising one-shot multi-vibrators K1–K4, each with a time constant equal to $T_s$. Commands which are to be transmitted over the transmission line are provided to a plurality of inputs 1–4 of the four trigger circuits K1–K4. The trigger circuits K1–K4 are each controlled by signals at their inputs 1–4 and by control signals supplied thereto by individual logic elements, illustrated in FIG. 1 and identified with "&". In one form of the invention, these logic units comprise AND gates, but in a modified form of the invention, they can comprise NAND gates, as described hereinafter.

The trigger circuits K1–K4 are each of the retriggerable type, and are triggered by a signal at its trigger inputs from the associated logic element, provided its enable input is activated by signal connected thereto from one of the inputs terminals 1–4. The trigger circuit changes its state at the appearance of the trigger input, and maintains its unstable state as long as further trigger signals arrive prior to expiration of the trigger time $T_s$.

The outputs of the trigger circuits K1–K4 are connected to inputs 11–14 of a command evaluator BW. The command evaluator BW has a first plurality of outputs 21–24 connected to inputs of a transmitting modem FS. A second set of outputs 25–28 of the command evaluator BW are connected to one input of each of the logic elements associated with the trigger circuits K1–K4, the second input of which is connected to a source of trigger pulses via a terminal T. The frequency of the trigger pulses selected have a relatively high value, such as 10 kHz to 1 MHz, so that the generation of the output from the trigger circuits K1–K4 does not experience any substantial delay after presentation of the enable signal via the inputs 1–4.

Commands may appear individually at the input terminals 1–4, or may occur simultaneously at two or more input terminals. The arrangement of the present invention is particularly suitable when there is a high probability of no command appearing at any of the input terminals, a low probability of only one command, and a very low probability of two or more commands occuring simultaneously.

Table 1 indicates the outputs presented to the output lines 21–28 of the command evaluator BW, in response to every possible combination of inputs applied to its inputs 11–14. The command evaluator BW may be constructed as a ROM, producing signals on its eight outputs in accordance with addresses identified by signals supplied to its inputs 11–14, or alternatively, it may be constructed of logic units for developing the required output signals in response to appearance of the input signals, as shown in Table 1.

Figure 2:
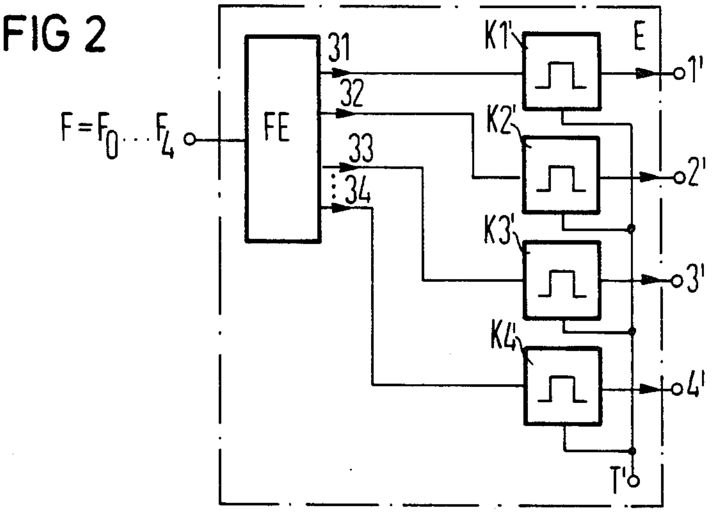
FIG. 2 is a schematic diagram of receiving equipment associated with an illustrative embodiment of the present invention.
Figure 3:
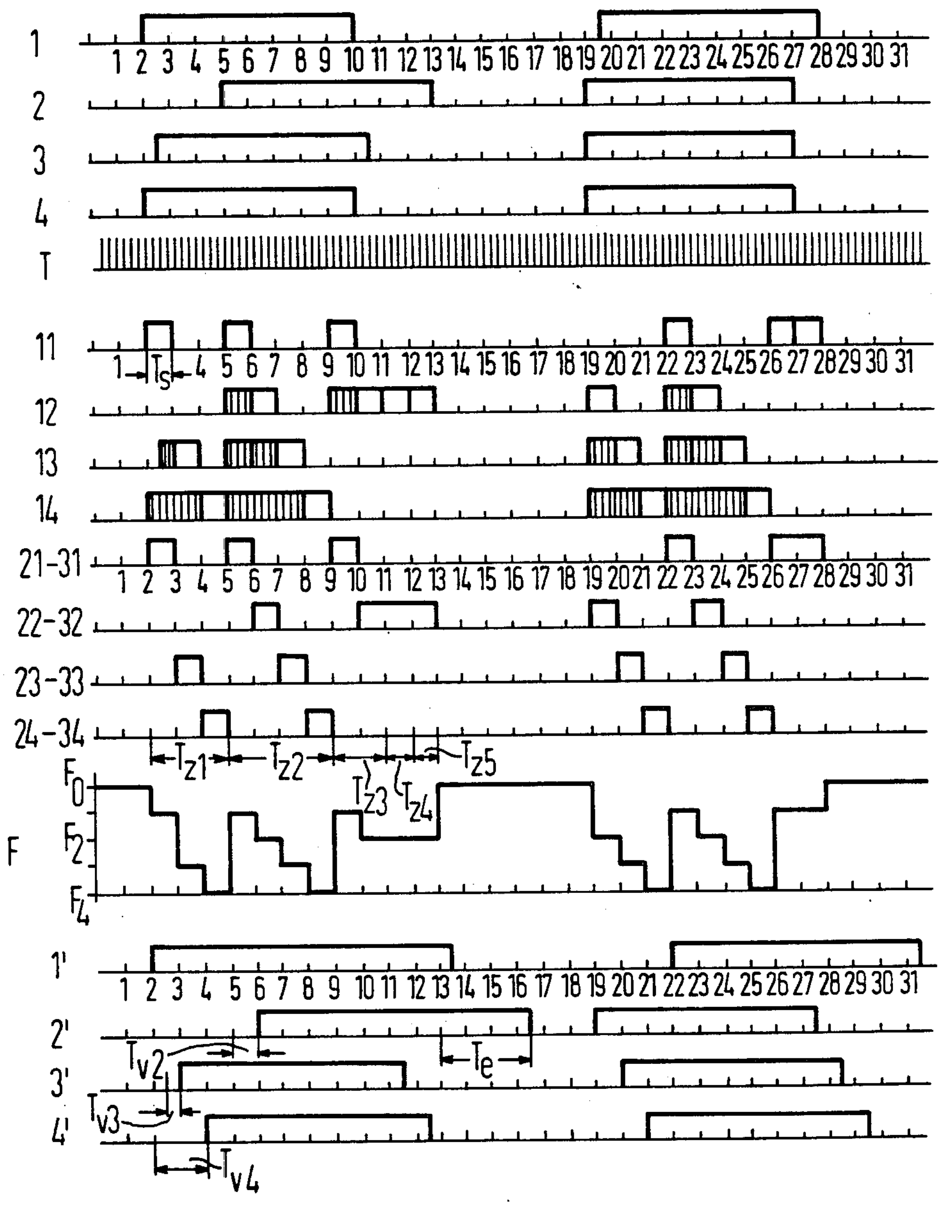
FIG. 3 is a series of waveforms, relative to time, showing the sequence of operations of the apparatus of FIGS. 1 and 2 under various conditions.

FIG. 3 illustrates a sequence of commands applied to terminals 1–4 of FIG. 1 (shown in FIG. 3 on lines 1–4, respectively), with the trigger pulses being shown on line T. Lines 11–14 of FIG. 3 illustrate the signals appearing on lines 11–14 in response to the input commands shown on lines 1–4. On lines 12–14, retriggering is illustrated by vertical lines coincident with the trigger pulses T, while the time-out of a trigger circuit following the last retriggering pulse is shown by a rectangular waveform. Lines 21–31 through 24–34 illustrate signals appearing at the output lines 21–24 of the command evaluator BW, in response to the command sequences shown on lines 1–4. The same signals appear on lines 31–34 of a receiving modem FE, illustrated in FIG. 2, located at the receiving end of the transmission line. Line F of FIG. 3 illustrates which of several discrete frequencies is transmitted over the transmission line at any given time. The frequency $F_0$ is transmitted when no command is present at any of the input terminals 1–4. Four individual frequencies $F_1$–$F_4$ are transmitted at times coincident with the signals on lines 21–24.

TABLE 1

| Command Evaluator BW | | | | | | | | | | | |
|---|---|---|---|---|---|---|---|---|---|---|---|
| Inputs | | | | Outputs | | | | | | | |
| 14 | 13 | 12 | 11 | 28 | 27 | 26 | 25 | 24 | 23 | 22 | 21 |
| 0 | 0 | 0 | 0 | 1 | 1 | 1 | 1 | 0 | 0 | 0 | 0 |
| 0 | 0 | 0 | 1 | 1 | 1 | 1 | 0 | 0 | 0 | 0 | 1 |
| 0 | 0 | 1 | 0 | 1 | 1 | 0 | 0 | 0 | 0 | 1 | 0 |
| 0 | 0 | 1 | 1 | 1 | 1 | 1 | 0 | 0 | 0 | 0 | 1 |
| 0 | 1 | 0 | 0 | 1 | 0 | 0 | 0 | 0 | 1 | 0 | 0 |
| 0 | 1 | 0 | 1 | 1 | 1 | 1 | 0 | 0 | 0 | 0 | 1 |
| 0 | 1 | 1 | 0 | 1 | 1 | 0 | 0 | 0 | 0 | 1 | 0 |
| 0 | 1 | 1 | 1 | 1 | 1 | 1 | 0 | 0 | 0 | 0 | 1 |
| 1 | 0 | 0 | 0 | 0 | 0 | 0 | 0 | 1 | 0 | 0 | 0 |
| 1 | 0 | 0 | 1 | 1 | 1 | 1 | 0 | 0 | 0 | 0 | 1 |
| 1 | 0 | 1 | 0 | 1 | 1 | 0 | 0 | 0 | 0 | 1 | 0 |
| 1 | 0 | 1 | 1 | 1 | 1 | 1 | 0 | 0 | 0 | 0 | 1 |
| 1 | 1 | 0 | 0 | 1 | 0 | 0 | 0 | 0 | 1 | 0 | 0 |
| 1 | 1 | 0 | 1 | 1 | 1 | 1 | 0 | 0 | 0 | 0 | 1 |
| 1 | 1 | 1 | 0 | 1 | 1 | 0 | 0 | 0 | 0 | 1 | 0 |
| 1 | 1 | 1 | 1 | 1 | 1 | 1 | 0 | 0 | 0 | 0 | 1 |

The example illustrated in FIG. 3 will now be described. At the begining, at time t=0, all trigger circuits K1–K4 receive trigger pulses from the trigger pulse source T, via their logic elements, with the word "1111" being supplied to the inputs of these logic elements from the outputs 25–28 of the command evaluator BW, as shown in Table 1. The outputs of the trigger circuits K1–K4 produce at this time, the word "0000", which is presented to the inputs 11–14 of the command evaluator BW, and the outputs on lines 21–24 of the command evaluator manifest the word "0000". This is the quiescent condition of the apparatus shown in FIG. 1.

As shown in FIG. 3, commands simultaneously appear at inputs 1 and 4 at time t2. Trigger circuits K1 and K4 both are switched to their unstable states at the time of the trigger pulses which first coincide with the command signals presented to inputs 1 and 4. Accordingly, the signals on lines 11 and 14 switch their states, so that the word "1001" is now applied to the input lines 11–14 of the command evaluator. This leads to an output of the word "1000" on the output lines 21–24, as shown in Table 1. This causes the transmitting modem FS to transmit a frequency F1 over the transmission line, corresponding to the command applied to the terminal 1, as shown in Table 2.

TABLE 2

| Transmit Modem FS | | | | | | | | |
|---|---|---|---|---|---|---|---|---|
| Input | | | | Output | | | | |
| 24 | 23 | 22 | 21 | $F_4$ | $F_3$ | $F_2$ | $F_1$ | ($F_0$) |
| 0 | 0 | 0 | 0 | — | — | — | — | x |
| 0 | 0 | 0 | 1 | — | — | — | x | — |
| 0 | 0 | 1 | 0 | — | — | x | — | — |
| 0 | 1 | 0 | 0 | — | x | — | — | — |
| 1 | 0 | 0 | 0 | x | — | — | — | — |

The output signals $F_0$–$F_4$ transmitted by the modem FS, in response to all possible conditions of the inputs lines 21–24, are illustrated in Table 2.

It will be appreciated that the command applied to the terminal 1 is immediately connected through to the transmission line via the modem FS, whereas the command appearing at the input 4 is initially suppressed by operation of the command evaluator BW. The output lines 25–28 of the command evaluator present the "0111" to the logic elements associated with the trigger circuits K1–K4, so that (with the logic elements "&" being AND gates) trigger pulses are applied to the trigger circuits K2–K4, but not to the trigger circuit K1, which is allowed to time-out. As no commands are connected to the enable inputs of the trigger circuits K2 and K3, they remain in their stable state, whereas the trigger circuit K4 is maintained in its unstable state, by retriggering with each trigger pulse, as long as the command persists at input 4.

As shown in Table 1, the command evaluator BW is arranged so as to rank the input terminals 1–4 in a definite priority sequence, with the highest priority being allocated to the input terminal 11, and the lowest priority allocated to the input terminal 14.

As shown in FIG. 3, a command appears on input 3 at time 2.5 and the trigger circuit K3 assumes its unstable state, coincident with the next trigger pulse T, and supplies a signal to input 13 of the command evaluator BW. The trigger circuit K1 times-out at time t3, so that the signal on the line 11 ends as the trigger circuit K1 resumes its stable state.

As shown in table 1, the output of the command evaluator BW is not changed by the change in the condition of line 13, but when line 11 changes, the word "0011" at the inputs 11–14 of the command evaluator leads to the word "0010" at the outputs 21–24, causing the modem FS to transmit the signal F3. The output lines 25–28 now present the word "0001" which retriggers only the trigger circuit K4, thus allowing the trigger circuit K3 to the time-out.

The trigger circuit K3 times-out at time t4, resulting in the change in state of the output lines 21–24, so as to cause the modem FS to transmit the frequency F4, corresponding to the pending command at input terminal 4. This results in the output lines 25–28 manifesting an output word of "0000", thus inhibiting trigger pulses for all of the trigger circuits K1–K4, begining at time t4. At time t5, K4 times-out, leading to the output word "0000" at the inputs 11–14, so that the word "1111" is produced on output lines 25–28, after which all trigger circuits K1–K4 are supplied with continuous trigger pulses via their logic elements. After all of the triggers K1–K4 have timed-out, the modem FS transmits a signal $F_0$ indicating no commands are pending, or else transmits no signal at all.

Lines 11–14 of FIG. 3 illustrate the sequence of signals on lines 11–14, and also when the signals are being retriggered. Lines 21–24 indicate the sequence of outputs on the lines 21–24. It is apparent that these signals are presented to the modem FS one at a time, in the order of the highest priority command than pending.

The example in FIG. 3 indicates that the commands presented to inputs 1 and 4 persist until time 10, with the command presented to input 3 persisting until time 10.5, and the command on input 2 persisting until time 13. Between times t5 and t9, all four commands are pending, and four pulses are presented consecutively to lines 21–24. Immediately after t10, however, two commands are pending and after t11, only one command persists at input terminal 2. As indicated on line 12, continuous pulses are produced on line 12, during each consecutive time period, as long as the command persists on input terminal 2. The sequence is also shown in lines 21–24.

The duration of the cycle times is illustrated for the different sequences by the cycle time durations $T_{z1}T_{z5}$ illustrated below line 24 of FIG. 3.

It will be appreciated that the cycle of pulses corresponding to pending commands is dependent only on the number of simultaneous pending command, and not on the maximum number of possible inputs. Thus, during the time periods t2–t5, three input commands are pending, and the cycle is three time periods long. During time periods t5–t9, four commands are pending, and the cycle is four time periods long. The cycle of time periods t9–t11 is only two time periods long, because following time t10, only two commands were pending. Following time 10.5, only one command is pending, at input terminal 2, so that subsequent cycles are only one pulse length each.

Line F of FIG. 3 indicates the frequency of the signal transmitted over the transmission line during each time period.

Begining at time 19, a different sequence of commands is illustrated, in which commands are presented simultaneously to inputs 2–4 at time t19, and a command is not presented to input 1 until time t19.5. As illustrated in lines 11–14, trigger circuit K2 is permitted to time-out first, since it is the highest priority trigger circuit to receive a command at t19, after which no triggering pulses are applied to the trigger circuit K1, until after trigger circuit K4 times out. Thus, the priority sequence of the apparatus of FIG. 1 results in the selection of a signal for the modem FS of the signal corresponding to a command having the highest priority then pending, but a lower priority than the previously transmitted command. Thus, even though the command presented to terminal 1 would have the highest priority among all commands presented simultaneously to inputs 1–4, in the sequence illustrated begining at time T19, it results in the lowest priority.

Figure 4:
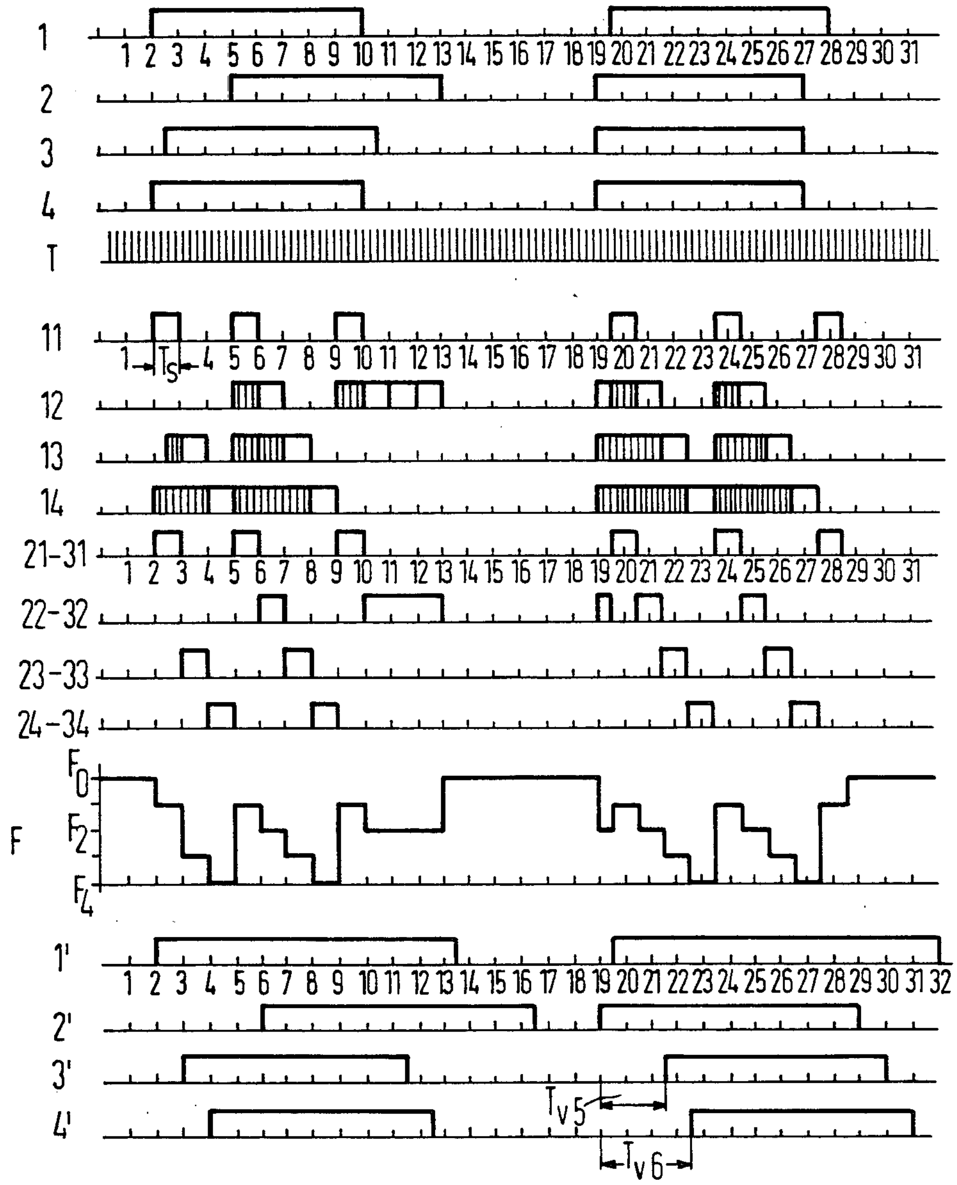
FIG. 4 is a sequence of waveforms, relative to time showing the sequence of operations of the apparatus of FIGS. 1 and 2, with a modified form of the invention.

When NAND gates are substituted for AND gates in the logic elements associated with the trigger circuits K1–K4, a different priority sequence is established, in which newly arriving, higher priority commands cause an existing cycle of a lower priority command to be aborted, with the newly arrived command immediately resulting in transmission of a frequency corresponding to the new higher priority command. Operation of this arrangement is illustrated in FIG. 4, in which lines 1–4 indicate the same sequence of commands as described above in connection with FIG. 3. Up to time t19, the same sequences of outputs is produced, since no newly arriving command interrupts the transmission of a frequency associated with a command of lower priority. However, the command sequence begining at time t19 is modified, since at time t19.5 the output corresponding to the command supplied to terminal 2 is aborted and the signal associated with the new command applied to terminal 1 is immediately generated for the next time period. Subsequently, since all commands are present, all of the output signals are generated in the order of their priority. Line F of FIG. 4 indicates the frequency of transmission over the transmission line, by the modem FS, at any given time.

FIG. 2 illustrates a schematic diagram of receiving apparatus located at the receiving side of the transmission line. It incorporates a receiving modem FE which is provided (if desired) with a code checking unit, and n trigger circuits, for example four, K1′–K4′. Each of the trigger circuits has a time constant $T_e$, and is supplied with triggering pulses from a trigger pulse source T′. The outputs 31–34 of the modem FE are connected to the enable inputs of the trigger circuits K1′–K4′, so that each of the trigger circuits is triggered, at the time of the first trigger pulse T′, following appearance of a signal on its enable input.

Table 3 indicates the outputs on the lines 31–34 of the modem FE, in response to receipt of signals $F_0$–$F_4$ of the transmission line.

Operation of trigger circuits K1′–K4′ guarantees that appropriate outputs are connected to the output terminals 1′–4′, with rectangular waveforms, even though the rising edge of the output signals applied to lines 31–34 may be distorted.

TABLE 3

| | Receive Modem FE | | | |
|---|---|---|---|---|
| Input | Output | | | |
| F | 34 | 33 | 32 | 31 |
| ($F_0$) | 0 | 0 | 0 | 0 |
| $F_1$ | 0 | 0 | 0 | 1 |
| $F_2$ | 0 | 0 | 1 | 0 |
| $F_3$ | 0 | 1 | 0 | 0 |
| $F_4$ | 1 | 0 | 0 | 0 |

Referring to Table 3, the quiescent frequency $F_0$ leads to the production of the word "0000" at the outputs 31–34, whereas the other frequencies which may be transmitted on the transmission line each leads to the signal on an individual one of the four lines 31–34. Each of these lines is connected individually to one of the trigger circuits K1′–K4′, which causes operation of the respective trigger circuit at the time of the next trigger pulse T′. Each of the trigger circuits K1′–K4′ has the time constant $T_e$, which is somewhat longer than the maximum interruption time between successive signals for the same command, namely $(n-1)T_s$, so that the output signals are delivered to the output terminals 1′–4′ continuously, as long as a command is presented to one of the input terminals 1–4 continuously. When no signal is received on the respective line 31–34 for a time equal to $T_e$, then the operated trigger circuit K1′–K4′ times-out, ending the output signal at the output terminal 1′–4′.

A quiescent frequency $F_0$ facilitates checking the proper operation of the system, since the failure of any frequency to appear indicates an error condition.

In FIG. 3, the lines 1′–4′ indicate the signals made available at the terminals 1′–4′ of the apparatus in FIG. 2, for the conditions illustrated in lines 1–4 of FIG. 3. $T_v$ indicates the delay time between appearance of command at one of the inputs 1–4 at the sending system of FIG. 1, and the reproduction of a command of the corresponding terminal 1'–4' of the receiving equipment illustrated in FIG. 2. It is seen that that every delay time $T_v$ is smaller than $(n-1)T_s$. Thus, as shown in FIG. 3, there is no delay, other than the transmission delay, between presentation of the command (at time t2) at terminal 1, and its reproduction at terminal 1'. The delay $T_{v3}$ in transmitting the signal applied to input terminal 3 is one half time unit, the delay $T_{v2}$ is relative to the command applied to terminal 2, is one half time unit, and the delay $T_{v4}$ relative to the command applied to terminal 4 is two time units.

FIG. 4 shows, in lines 1'–4', the sequence of the signals produced at the receiving end of the transmission line, using NAND gates for the logic elements. As shown in FIG. 4, the time delay is less than the maximum cycle time $nT_s$. As shown in FIG. 4, there is no delay, other than transmission time, for the signal supplied to terminals 1' and 2' (at time t19 and thereafter), with delays of 2.5 time units and 3.5 time units for $T_{v5}$ and $T_{v6}$, applicable to commands applied to terminals 3 and 4. These delays result from the fact that immediate attention is given to the appearance of the highest priority signal applied to input terminal 1.

In the above description, the term "transmission line" means any single channel made of communication, whether by wire, wireless, etc.

It will be apparent from the foregoing that the present invention provides a simple and economical means for the simultaneous transmission of a plurality of commands over a single channel. The channel does not require a broad bandwidth, and all of the commands input to the sending equipment (1) are manifested continuously by outputs of the receiving equipment (in FIG. 2), as long as the commands persist. It is apparent that various modifications and additions may be made in the apparatus of the present invention without departing from the essential features of novelty thereof, which are intended to be defined and secured by the appended claims.

What is claimed is:

1. A method for transmitting n independent simultaneously existing input commands over a single transmission line and outputting the same at a receiver during a transmitting cycle including the steps of generating command-associated signals in response to each input command to be transmitted, transmitting said command-associated signals over said transmission line in series during said cycle, generating output signals corresponding to said input commands at a plurality of output terminals in response to said command-associated signals which are transmitted, cyclically transmitting only said command-associated signals in a prescribed sequence as long as a plurality of said simultaneous input commands exist, and the length of said cycle being equal to t times the number of simultaneously existing input commands, where t is the transmission time for each of said command-associated signals.

2. The method according to claim 1, including the step of generating a no-command signal in response to no commands being present, and transmitting said no-command signal over said transmission line.

3. Apparatus for carrying out the transmission of n independent simultaneously existing input commands over a single channel transmission line during a transmitting cycle including, in combination;

a first plurality of trigger circuits adapted to receive, individually, a plurality of input commands, a logic element for each of said trigger circuits for controlling its triggering in response to an input command, a command evaluator having a plurality of inputs, each connected to an individual one of said trigger circuits, and a first plurality of outputs connected to said logic elements for controlling continued triggering of said trigger circuits, and means connected to another output of said command evaluator for transmitting command-associated signals serially over said transmission line in response to a sequence of output signals produced by said command evaluator, said command evaluator being adapted to produce a prescribed serial sequence of output signals in response to the existence of simultaneous input commands, and the length of said cycle being equal to t times the number of simultaneously existing input commands, where t is transmission time for each of said command-associated signals.

4. Apparatus according to claim 3, including decoding means connected to said transmission line for performing a serial to parallel conversion of signals transmitted over said transmission line, and a plurality of trigger circuits connected to receive said parallel signals, each receiving trigger circuit having a trigger time greater than $T_s(n-1)$, where $T_s$ is the trigger time of the trigger circuits of said first plurality and n is the maximum number of simultaneous commands.

5. Apparatus according to claim 4, wherein the trigger circuits of said first plurality are constructed with a trigger time $T_s$ which is greater than the period required for unambiguous reception and decoding of signals transmitted over said transmission line.

6. Apparatus according to claim 3, wherein said logic elements comprise NAND gates.

7. Apparatus according to claim 3, wherein said logic elements comprise AND gates.

8. Apparatus according to claim 3, wherein said trigger circuits are one-shot multi-vibrators.

* * * * *